(12) United States Patent
Albrecht et al.

(10) Patent No.: US 7,869,367 B2
(45) Date of Patent: Jan. 11, 2011

(54) METHODS AND SYSTEMS FOR CHECKING EXPECTED NETWORK TRAFFIC

(75) Inventors: Alan R. Albrecht, Granite Bay, CA (US); Steven Glen Jorgensen, Newcastle, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1371 days.

(21) Appl. No.: 11/291,200

(22) Filed: Nov. 30, 2005

(65) Prior Publication Data

US 2007/0121517 A1    May 31, 2007

(51) Int. Cl.
    G01R 31/08    (2006.01)
    G06F 11/00    (2006.01)
    G08C 15/00    (2006.01)
    H04J 1/16     (2006.01)
    H04J 3/14     (2006.01)
    H04L 1/00     (2006.01)
    H04L 12/26    (2006.01)
    H04L 12/56    (2006.01)
    G01R 31/28    (2006.01)

(52) U.S. Cl. ............... 370/241; 370/394; 714/51; 714/715; 714/742

(58) Field of Classification Search ............ 370/241, 370/241.1, 242, 245, 247, 254, 255; 714/51, 714/715, 742

See application file for complete search history.

(56) References Cited

U.S. PATENT DOCUMENTS

| | | | | |
|---|---|---|---|---|
| 4,322,793 A * | 3/1982 | Andersson et al. | ........... | 710/305 |
| 5,271,000 A * | 12/1993 | Engbersen et al. | ........... | 370/244 |
| 5,305,385 A * | 4/1994 | Schanning et al. | ............ | 726/13 |
| 5,392,212 A * | 2/1995 | Geist | ........................ | 715/236 |
| 5,544,308 A * | 8/1996 | Giordano et al. | ............. | 714/26 |
| 6,963,887 B2 * | 11/2005 | Wong et al. | ................. | 708/210 |
| 7,065,482 B2 * | 6/2006 | Shorey et al. | ............... | 709/224 |
| 7,154,944 B2 * | 12/2006 | Jungerman | .................. | 375/224 |
| 7,284,177 B2 * | 10/2007 | Hollander et al. | ........... | 714/739 |
| 7,343,540 B2 * | 3/2008 | Khermosh et al. | .......... | 714/758 |
| 7,539,489 B1 * | 5/2009 | Alexander | ................... | 455/423 |
| 2001/0027539 A1 * | 10/2001 | Nozuyama | .................... | 714/33 |
| 2001/0050901 A1 * | 12/2001 | Love et al. | .................. | 370/235 |
| 2002/0052910 A1 * | 5/2002 | Bennett et al. | .............. | 709/104 |
| 2002/0122413 A1 * | 9/2002 | Shoemake | ................... | 370/349 |
| 2003/0076115 A1 * | 4/2003 | Yamasaki | .................... | 324/601 |
| 2003/0191590 A1 * | 10/2003 | Narayan et al. | ................ | 702/68 |
| 2005/0108601 A1 * | 5/2005 | Driediger et al. | ............ | 714/712 |
| 2005/0157647 A1 * | 7/2005 | Sterne et al. | ................. | 370/235 |
| 2006/0107141 A1 * | 5/2006 | Hekmatpour | ................ | 714/724 |
| 2006/0171301 A1 * | 8/2006 | Casper et al. | ............... | 370/225 |
| 2006/0294297 A1 * | 12/2006 | Gupta | ........................ | 711/108 |
| 2007/0115833 A1 * | 5/2007 | Pepper et al. | ............... | 370/241 |

* cited by examiner

*Primary Examiner*—Seema S Rao
*Assistant Examiner*—Xavier Szewai Wong

(57) ABSTRACT

A method for checking expected network traffic is disclosed. The method for checking expected network traffic includes accessing pre-registered expected results of a network traffic checking exercise that include expected packet content verification information for individual packets of the network traffic. In addition, the method includes accessing network traffic where individual packets of the network traffic include actual packet content verification information. Individual packets are identified that have expected packet content verification information that does not match their actual packet content verification information and individual packets are identified that have expected packet content verification information that does match their actual packet content verification information.

25 Claims, 8 Drawing Sheets

| PACKET | PORT | FCS VALUE | NUMBER OF PACKETS |
|---|---|---|---|
| 1 | 6 | xzy | 5 |
| 2 | 9 | xxz | 4 |
| | | | |
| | | | |

METHODS AND SYSTEMS FOR CHECKING EXPECTED NETWORK TRAFFIC

TECHNICAL FIELD

Embodiments of the present invention pertain to methods and systems for checking expected traffic.

BACKGROUND ART

Computer networks typically include a plurality of network-coupled devices that have the capacity to communicate between themselves. The communications between the network-coupled devices can include traffic that can be composed of a series of packets. The devices in the network can receive and/or transmit traffic. Packets that are received can be modified before they are forwarded. Devices that function improperly can cause improper packet modifications or errors. The traffic that is transmitted by such improperly functioning devices is unreliable.

Conventional traffic checking systems examine the traffic that is forwarded from a device under test (DUT) to determine if the DUT has handled the traffic that is forwarded by it properly. Stimulus traffic composed of a series of packets that are generated by a traffic generator are transmitted to the DUT to cause the DUT to forward traffic that can then be examined by the traffic checking system. Such traffic checking systems determine whether the DUT has transmitted the correct traffic, in the correct form, the correct number of times. Moreover, such systems facilitate an assessment of traffic flow through the DUT and provide information that assists network designers in the planning of networks.

Conventional traffic checking systems can be found in equipment that is designed by suppliers who specialize in traffic checking technologies. Such traffic checking systems generally do not employ large, flexible, lists of data that enable an identification of expected packets or the automated checking of traffic content and its modifications at high data rates. Moreover, when a packet that contains an error is detected, there is no mechanism in such systems for capturing the packet for analysis purposes. Importantly, in many cases, conventional equipment is specialized and expensive and does not take advantage of the features that are already a part of the DUT (e.g., switching chips) that could provide cost savings.

Some conventional traffic checking systems only check to determine whether a frame check sequence (FCS) of a forwarded packet is valid and whether the number of forwarded packets is correct. Consequently, if a DUT carries out an incorrect modification to a packet, but places the proper FCS on the improperly modified packet and forwards it out of the expected port, the test equipment may not detect the failure. A conventional solution to this shortcoming is to add a field to stimulus packets that are generated that can be read to determine whether portions of the packets have at all been modified. However, this solution is inadequate because such fields do not facilitate a determination of whether a packet has been correctly modified. In addition, the additional field is problematic as it places an additional constraint on the generation of stimulus packets.

DISCLOSURE OF THE INVENTION

A method for checking expected network traffic is disclosed. The method for checking expected network traffic includes accessing pre-registered expected results of a network traffic checking exercise that include expected packet content verification information for individual packets of the network traffic. In addition, the method includes accessing network traffic where individual packets of the network traffic include actual packet content verification information. Individual packets are identified that have expected packet content verification information that does not match their actual packet content verification information and individual packets are identified that have expected packet content verification information that does match their actual packet content verification information.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3C shows an exemplary table of expected results according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the following discussion the term "traffic component" is intended to refer to a data unit of network traffic (e.g., packet, frame etc.) that is generated for receipt by a device under test (DUT). Moreover, the term "traffic component content verification information" is intended to refer to additional characters (e.g., frame check sequence etc.) added to a traffic component that summarize the content of the traffic component and enable the detection of errors in the traffic component. Additionally, the term "traffic checking exercise" is intended to refer to an examination of the handling (e.g., forwarding, modification, etc.) of traffic by a target device (e.g., DUT).

SYSTEM FOR EXAMINING TRAFFIC OUTPUT OF A DEVICE UNDER TEST ACCORDING TO ONE EMBODIMENT OF THE PRESENT INVENTION

Figure 1A:
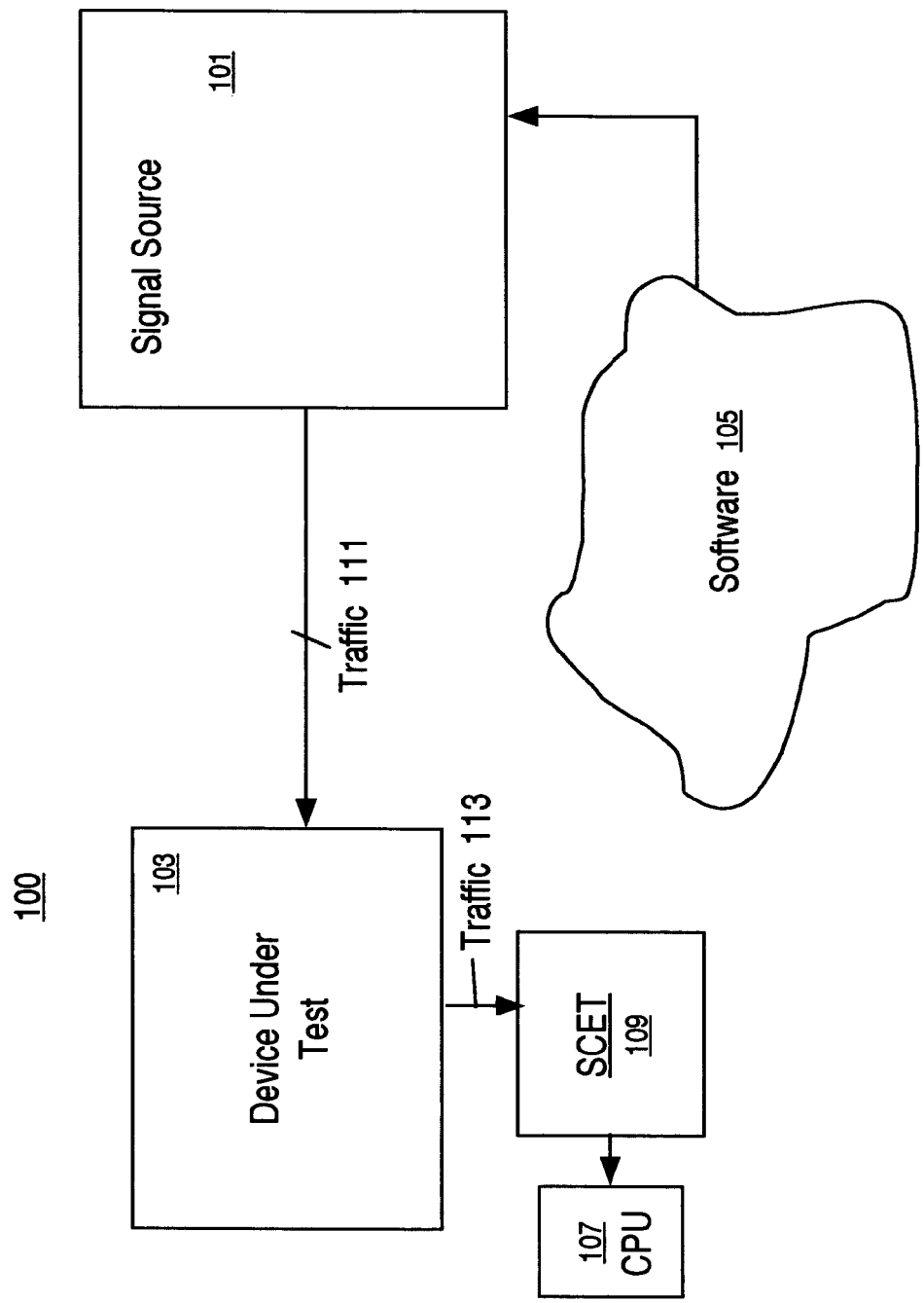
FIG. 1A shows components of a system for examining the traffic handled by a device under test (DUT) according to one embodiment of the present invention.

FIG. 1A shows components of a system 100 for examining the traffic handled by a device under test (DUT) 103 according to one embodiment of the present invention. It should be appreciated that the traffic that is handled by DUT 103 can be examined to determine whether or not the traffic has been properly treated. In one embodiment, the treatment of network traffic by DUT 103 can be examined by stimulating DUT 103 with input traffic and examining corresponding DUT 103 output traffic. More specifically, system 100 determines whether DUT 103 sends the correct traffic, in the correct form, the correct number of times. In one embodiment, these operations can be directed by system 109 for checking expected traffic SCET.

In one embodiment, SCET 109 is associated with DUT 103. It should be appreciated that SCET 109 may or may not physically reside at DUT 103. In the FIG. 1A embodiment, system 100 includes signal source 101, software 105, CPU 107, device under test (DUT) 103 and associated SCET 109.

Figure 1B:
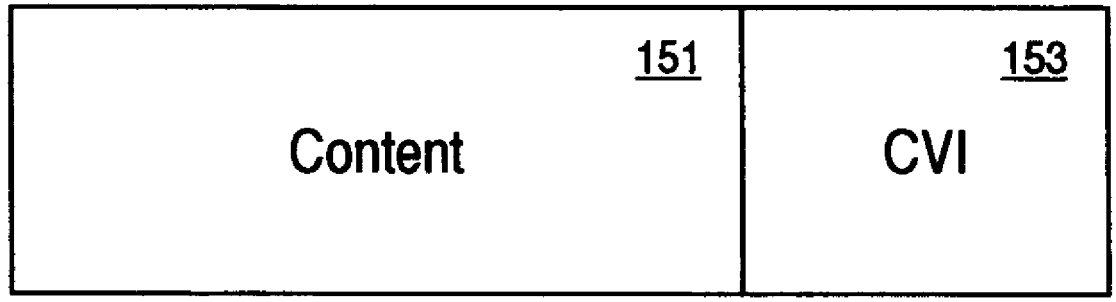
FIG. 1B shows a traffic component that includes content and associated content verification information according to one embodiment of the present invention.

Signal source 101 generates input traffic 111 that is transmitted to DUT 103. In one embodiment, signal source 101 generates input traffic 111 of a known content. The input traffic 111 that is generated is composed of traffic components 150 (e.g., packets) that include content 151 (e.g., a frame or frames of data) and associated content verification information 153 (e.g., frame check sequence [FCS]) as is shown in FIG. 1B. In one embodiment, the makeup of the input traffic 111 that is sent can be determined by software 105. In one embodiment, software 105 can initiate the transmission of input traffic 111 from signal source 101 to DUT 103. In alternate embodiments, a system user can initiate the transmission of input traffic 111.

DUT 103 is a network device (e.g., network switch chip, relay etc.) whose treatment of network traffic is being or is to be assessed. In one embodiment, as a part of the examination process, the operation of DUT 103 is stimulated by a traffic generator such as signal source 101. It should be appreciated that DUT 103 can receive input traffic 111 and forward output traffic 113 with or without modification. In one embodiment, output traffic 113 that is forwarded by DUT 103 is assessed to determine if the correct output traffic 113 is sent by DUT 103 in the correct form, the correct number of times.

SCET 109 confirms whether or not the output traffic 113 that is forwarded by DUT 103 matches expected DUT 103 forwarded traffic. In operation, SCET 109: (1) accesses the expected results of a traffic checking exercise that are registered beforehand (e.g., in storage units associated with SCET 109), (2) accesses output traffic 113 that is forwarded by or is to be forwarded by DUT 103 and (3) identifies components of output traffic 113 whose expected content verification information (e.g., expected FCS) does not match its actual content verification information (e.g., actual FCS) and components of output traffic 113 whose expected content verification information (e.g., expected FCS) does match its actual content verification information (e.g., actual FCS).

In one embodiment, SCET 109 can be separate from but operate in cooperation with components and operations of DUT 103. In another embodiment, SCET 109 can be encompassed by components and operations of DUT 103. SCET 109 can be implemented in hardware (one such implementation is discussed herein with reference to FIGS. 3A and 3B), in software or using a combination of both.

Software 105 calculates expected results of a traffic examination exercise and controls the generation of input traffic 111 that is sent to DUT 103. The expected results that are calculated by software 105 are stored in storage units of SCET 109.

CPU 107 accesses traffic components that have errors and assesses them in order to determine what the traffic component errors are. In one embodiment, SCET 109 directs the forwarding of traffic components containing errors to CPU 107.

OPERATION

Software 105 initiates the generation of input traffic 111 by prompting signal source 101 to transmit input traffic 111 to DUT 103 after expected results have been calculated by software 105 and registered in storage units of SCET 109. In response to the receipt of input traffic 111 that is sent from signal source 101, DUT 103 acts to forward (e.g., relays, outputs) output traffic 113 to downstream ports. SCET 109 accesses the output traffic 113 that is forwarded by DUT 103 and confirms whether or not the forwarded output traffic 113 matches the traffic that is expected. Traffic components with and without errors are counted in order to determine if traffic components have been duplicated or lost. Unexpected traffic components are forwarded to an analysis sub-system (e.g., CPU 107) for analysis.

In one embodiment, components such as the content addressable memory (CAM) and logic components that are found in some network switch chips can be employed to implement the above discussed SCET 109 as will be described in detail below with reference to FIGS. 3A and 3B. CAM and logic components can enable a network switch that contains such components to count and determine whether the traffic components (e.g., packets) that are received by another network switch chip (e.g., DUT 103) match expected traffic components (e.g., packets). In addition, these components provide the capacity to provide notification of traffic component discrepancies to internal or external components.

These components can be employed in very high data rate and low cost traffic checking and accounting implementations. In addition, all traffic that doesn't match expected traffic is easily captured without restrictions on packet size, content or modification. Because CAMs can accommodate several thousand entries, they can support a large amount of expected traffic.

SYSTEM FOR CHECKING EXPECTED TRAFFIC ACCORDING TO ONE EMBODIMENT OF THE PRESENT INVENTION

Figure 2:
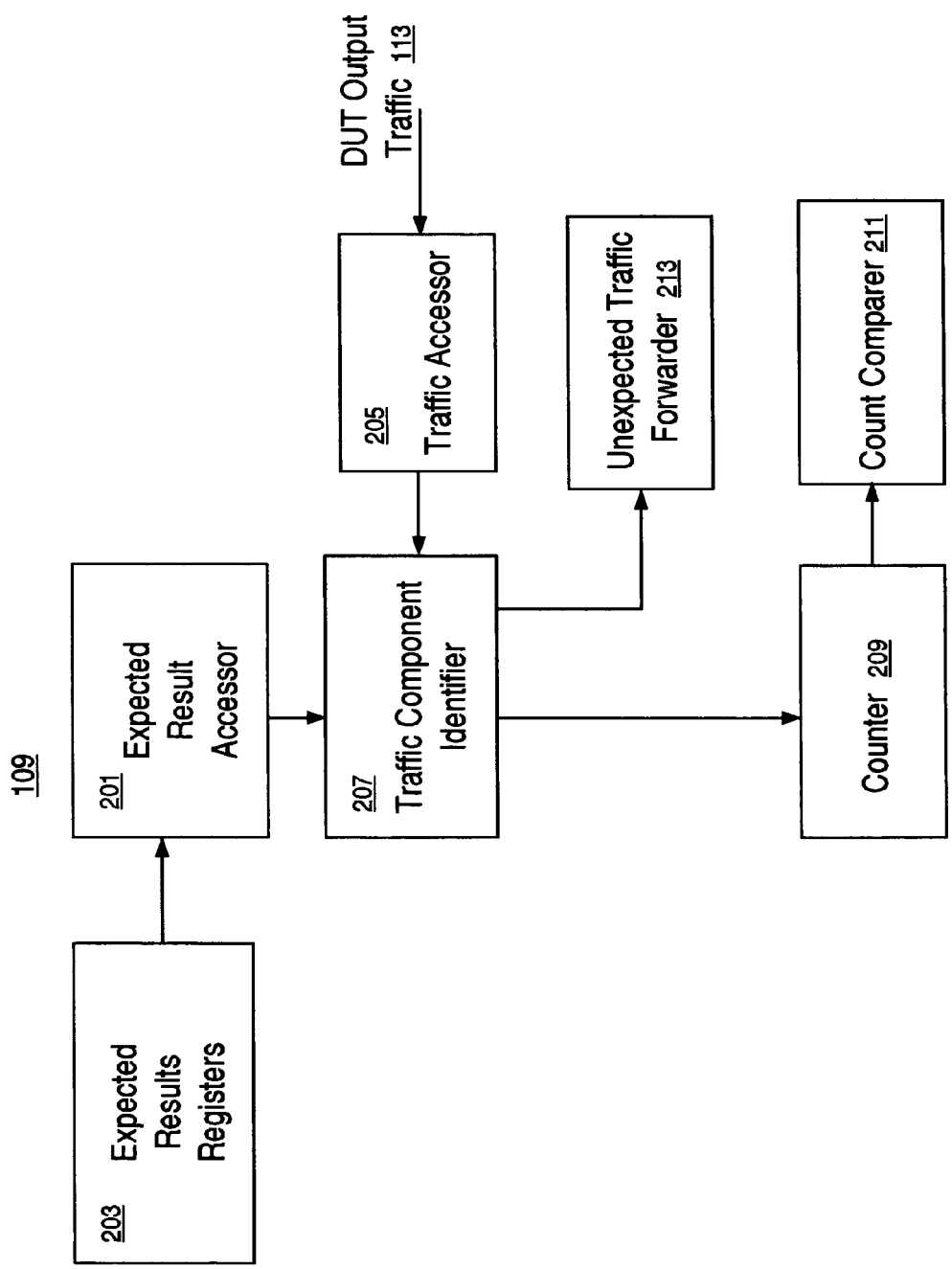
FIG. 2 shows functional blocks of system for checking expected traffic (SCET) according to one embodiment of the present invention.

FIG. 2 shows functional blocks of system 109 for checking expected traffic (SCET) according to one embodiment of the present invention. In one embodiment, SCET 109 examines traffic that is handled by a DUT (e.g., 103 in FIG. 1A) to determine if discrepancies exist between the traffic that is expected and the traffic that actually results from DUT operations. SCET 109 operates to confirm whether or not expected traffic components result from the treatment of input traffic (e.g., 111 in FIG. 1A) by a DUT (e.g., 103 in FIG. 1A) by verifying that content verification information that is associated with forwarded traffic (e.g., 113 in FIG. 1A) components have an expected value. Expected and unexpected traffic components (e.g., traffic components that have expected and unexpected content verification information values respectively) are counted.

In one embodiment, unexpected traffic components (e.g., packets) are forwarded to a traffic component analysis subsystem, e.g., 107 in FIG. 1A. In one embodiment, as discussed above, the total number of traffic components (e.g., 150 in FIG. 1B) of each type can be ascertained to determine if any of the traffic components have been duplicated or dropped. It should be appreciated that by comparing expected content verification information values to actual content verification information values modifications of any part of the content of a traffic component can be determined without a need to examine fields associated with individual portions of the traffic component.

In one embodiment, components and operations of SCET 109 can be separate from but operate cooperatively with components and operations of a DUT such as DUT 103 in FIG. 1A. In another embodiment, the components and operations of SCET 109 can reside at and/or can be encompassed by components and operations of a DUT, such as DUT 103 in FIG. 1A. It should be appreciated that SCET 109 can be implemented using hardware or software or a combination of both. In the FIG. 2 embodiment, SCET 109 includes expected results accessor 201, expected results registers 203, traffic accessor 205, traffic component identifier 207, counter 209, count comparer 211 and forwarder 213.

Referring to FIG. 2, prior to or as an initial operation of a traffic checking exercise, expected results of the traffic checking exercise are registered into expected results register 203. In one embodiment, the expected results that are registered can be generated by and accessed from software such as software 105 in FIG. 1A. In one embodiment, the expected results can include the expected traffic component content verification information (e.g., expected FCS) value for each component of traffic to be accessed in the traffic checking exercise. The expected results that are registered can be used by traffic component identifier 207 to identify the components of traffic whose expected content verification information (e.g., expected FCS) does or does not match the actual content verification information (e.g., actual FCS) that is associated with the traffic components.

Expected results accessor 201 accesses expected results of a traffic checking exercise such as the expected traffic component content verification information for each component of traffic that is handled by an associated DUT (e.g., DUT 103 in FIG. 1A). In one embodiment, expected results of a traffic checking exercise are accessed for subsequent access by traffic component identifier 207. In one embodiment, the expected results that are accessed by expected results accessor 201 can be used by traffic component identifier 207 to identify traffic components of DUT handled (e.g., forwarded etc.) traffic whose expected content verification information (e.g., expected FCS) does or does not match its associated content verification information (e.g., actual FCS).

Traffic accessor 205 accesss traffic (e.g., 113 in Figure in FIG. 1A) that is output by the DUT 103 in FIG. 1A. In one embodiment, each component of the accessed traffic (e.g., 113 in FIG. 1A) includes associated content verification information (e.g., FCS). In one embodiment, each component of the traffic (e.g., 113 in Figure in FIG. 1A) that is accessed by traffic accessor 205 is accessed therefrom by traffic component identifier 207 to determine if the traffic component content verification information which is associated with the accessed traffic component matches the traffic component content verification information that is expected.

Referring again to FIG. 2 traffic component identifier 207 identifies traffic components of DUT handled (e.g., forwarded etc.) traffic (e.g., 113 in FIG. 3A) whose expected content verification information (e.g., expected FCS) does or does not match its associated content verification information (e.g., actual FCS). In one embodiment, in order to accomplish this, traffic component identifier 207 compares the expected content verification information of DUT handled traffic components with the actual content verification information that is associated with DUT handled traffic components.

In one embodiment, traffic component identifier 207 can encompass or have associated therewith a counter 209 for counting instances where expected content verification data of a traffic component matches actual content verification data of a traffic component and instances where expected content verification data of a traffic component does not match actual content verification data of a traffic component.

Count comparer 211 compares a count of matches of expected content verification information and actual content verification information for each traffic component to an expected count of matches in order to identify duplicated or lost packets. Unexpected traffic forwarder 213 directs the forwarding of unexpected traffic components to an analysis sub-system (e.g., 107 in FIG. 1A) for analysis purposes.

CONFIGURATION OPERATIONS FOR SYSTEM FOR EXAMINING A DEVICE UNDER TEST ACCORDING TO ONE EMBODIMENT OF THE PRESENT INVENTION

Figure 3A:
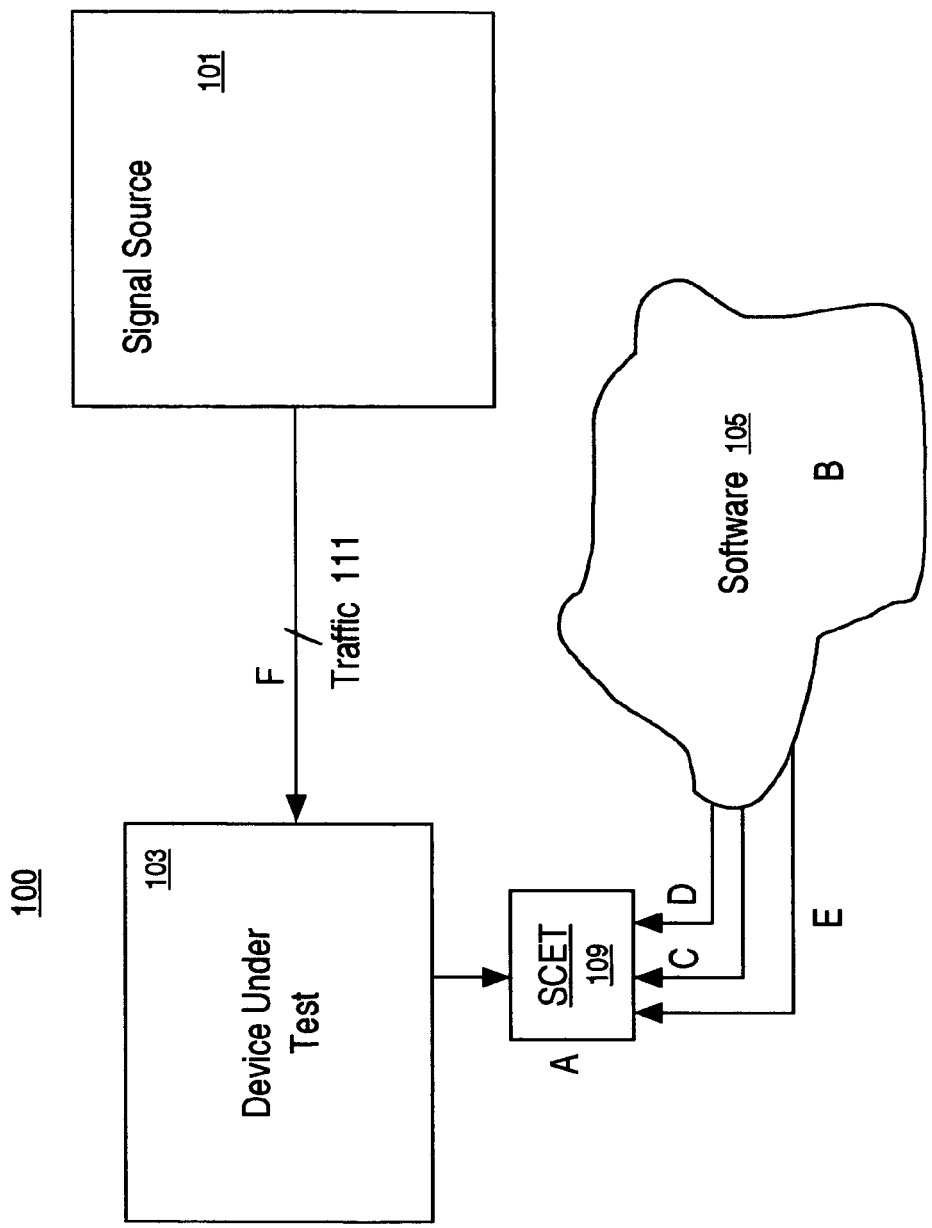
FIG. 3A illustrates operations performed to configure a system for examining a device under test according to one embodiment of the present invention.
Figure 3B:
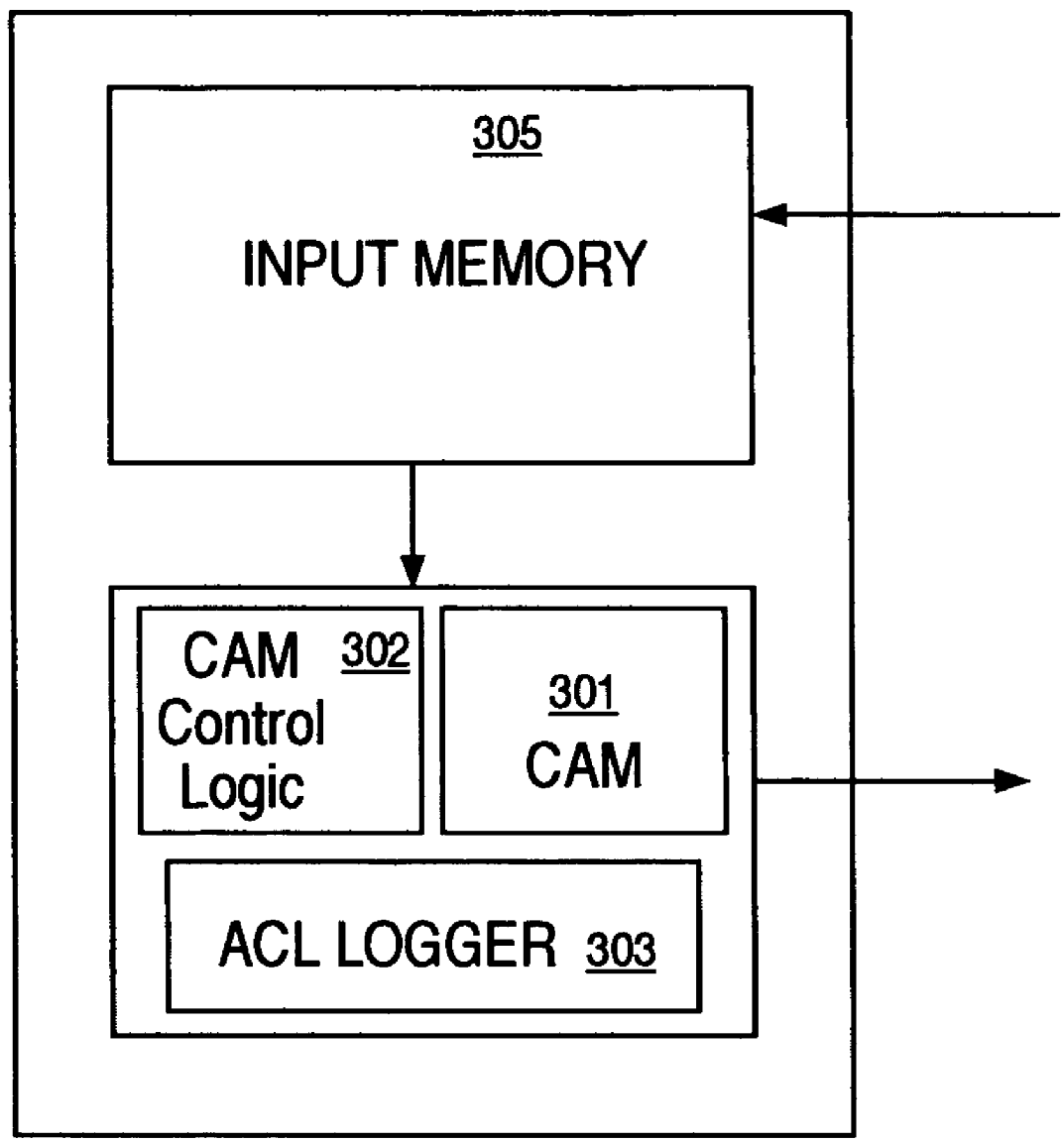
FIG. 3B shows components of a content addressable memory according to one embodiment of the present invention.

FIG. 3A illustrates operations performed to configure a system 100 for examining a device under test according to one embodiment of the present invention. In the embodiment illustrated in FIG. 3A, DUT 103 can be a switch with an associated SCET 109 that can include but is not limited to CAM 301, CAM logic 302, Access Control List (ACL) logger 303 and input memory 305 as is shown in FIG. 3B. In the FIG. 3A embodiment, the components and operations of SCET 109 that are discussed above with reference to FIG. 2 can be encompassed by these hardware components of DUT 103.

For example, in the FIG. 3A embodiment, CAM 301 can encompass the expected result accessor, e.g., 201 in FIG. 2, expected results register, e.g., 203 in FIG. 2, traffic accessor, e.g., 205 in FIG. 2, traffic component identifier, e.g., 207 in FIG. 2, and comparer e.g., 211 in FIG. 2 components of SCET 109. Moreover, Access Control List (ACL) logging counters can encompass counter, e.g., 209 in FIG. 2. The unexpected traffic forwarding functionality is implemented by programming a series of CAM data entries along with programmed expected values that direct the forwarding of unexpected traffic as is discussed below.

As discussed above with reference to FIG. 2, SCET 109 can determine whether a traffic component (e.g., 150 in FIG. 1B) contains an error by examining its associated content verification information (e.g., 153 in FIG. 1B) to determine whether it matches its expected content verification information. In the FIG. 3A embodiment, traffic component content verification information (e.g., 153 in FIG. 1B) is a frame check sequence (FCS) and traffic component (e.g., 150 in FIG. 1B) is a packet.

It should be appreciated that an FCS includes the final four bytes of an Ethernet packet. The FCS is a 32 bit value, that is mathematically calculated based on the contents of a packet or frame. Accordingly, if any bit of a frame changes, the resulting FCS can change. It should be appreciated that there is a 1 in $2^{**}32$ chance that two unrelated frames will map to the same FCS.

Referring to again to FIG. 3A, at (A) content addressable memory (CAM) 301 is programmed to search for specific search terms. In one embodiment, the search terms can include FCS and source port. In this manner CAM 301 is enabled to search for expected values of these parameters to determine whether associated content verification information matches expected content verification information as discussed herein. It should be appreciated that in other embodiments, other fields can be added to increase the specificity of the search. However, in one embodiment, only searches based on FCS are enabled.

At (B), software 105 determines expected results of the traffic checking exercise. In one embodiment, as a part of determining expected results, software 105 can determine which packets are to be received on particular ports of associated traffic checking equipment and the contents of those packets. The FCS is calculated for the expected packets and a table is generated contains port number, FCS value and expected number of packets with that pairing. FIG. 3C shows an exemplary table 350 that includes packet 351, port number 353, FCS value 355, and number of packets 357 according to one embodiment. In other embodiments, other table arrangements can be employed. It should be appreciated that the values contained in table 350 are only exemplary.

At (C), data storage units of CAM 301 are programmed with entries that detail the FCS of the expected packets and the port numbers upon which they are expected.

At (D), default entries are programmed at the end of the series of expected packets that direct a copying of any packet that hasn't matched expected values to the processing subsystem, e.g., 107 in FIG. 1A.

At (E), ACL logging counters 303 that count hits on each entry in the CAM 301 are cleared and enabled.

At (F), software 105 prompts the transmission of traffic from signal source 101 to DUT 103. In one embodiment, the traffic includes packets that are received and then forwarded by DUT 103. It should be appreciated that the packets can be either unchanged or modified (properly or improperly) by DUT 103. The ACL logging counters 303 log the results of the traffic checking exercise. SCET 109 forwards any unexpected packets to an analysis sub-system, e.g., 107 in FIG. 1A.

It should be appreciated that as a part of the traffic checking exercise the FCS of DUT 103 handled packets are compared by CAM 301 with the expected FCS of DUT 103 handled packets in order to identify expected and unexpected packets. Upon completion of the traffic checking exercise the total number of packets of each type (as logged by ACL logging counters) can be assessed to determine if any packets were duplicated or dropped. It should be appreciated that by checking expected FCS values for packets involved in the traffic checking exercise the proper performance of packet modifications in all portions of a packet can be assessed without examining the individual fields that correspond to those portions.

In an alternate embodiment, traffic checking exercises that involve a known, and limited number of packet variations can be performed. For example, in a quality of service (QOS) traffic checking exercise some packets can be marked as being within an allowable bandwidth while other packets can be marked as being beyond the allowable bandwidth. The respective expected FCS's of the involved packets can be programmed and the resulting counts evaluated at the end of the traffic checking exercise to determine if the distribution between the different types of packets appear correct. In another embodiment, the validity of a distribution method itself can be examined by comparing the distribution of counts among different ports. In these embodiments, relative counts between FCS/port pairs can be evaluated rather than exact expected values.

Advantages of embodiments of the invention include high performance checking of packet modifications and packet forwarding. In addition, unexpected packets are easily captured for analysis. Moreover, embodiments of the present invention provide an efficient way to quickly and accurately measure the distribution of a set of known packets for testing QOS. In exemplary embodiments, constraints are not placed on either contents or modifications of the packets.

EXEMPLARY OPERATIONS OF SYSTEM FOR CHECKING EXPECTED TRAFFIC ACCORDING TO EMBODIMENTS OF THE PRESENT INVENTION

Figure 4:
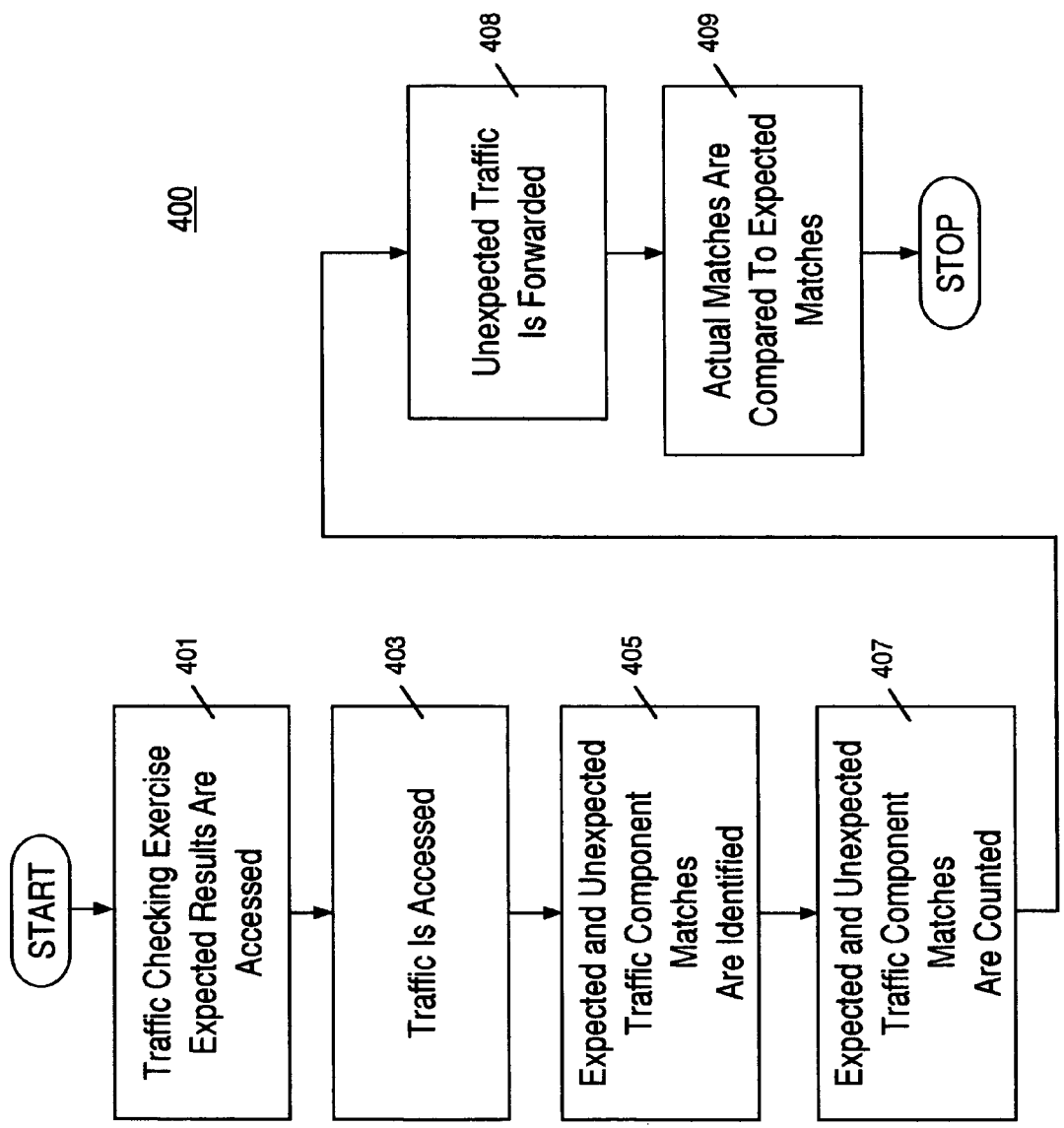
FIG. 4 shows a flowchart of a method for checking expected traffic according to one embodiment of the present invention.
Figure 5:
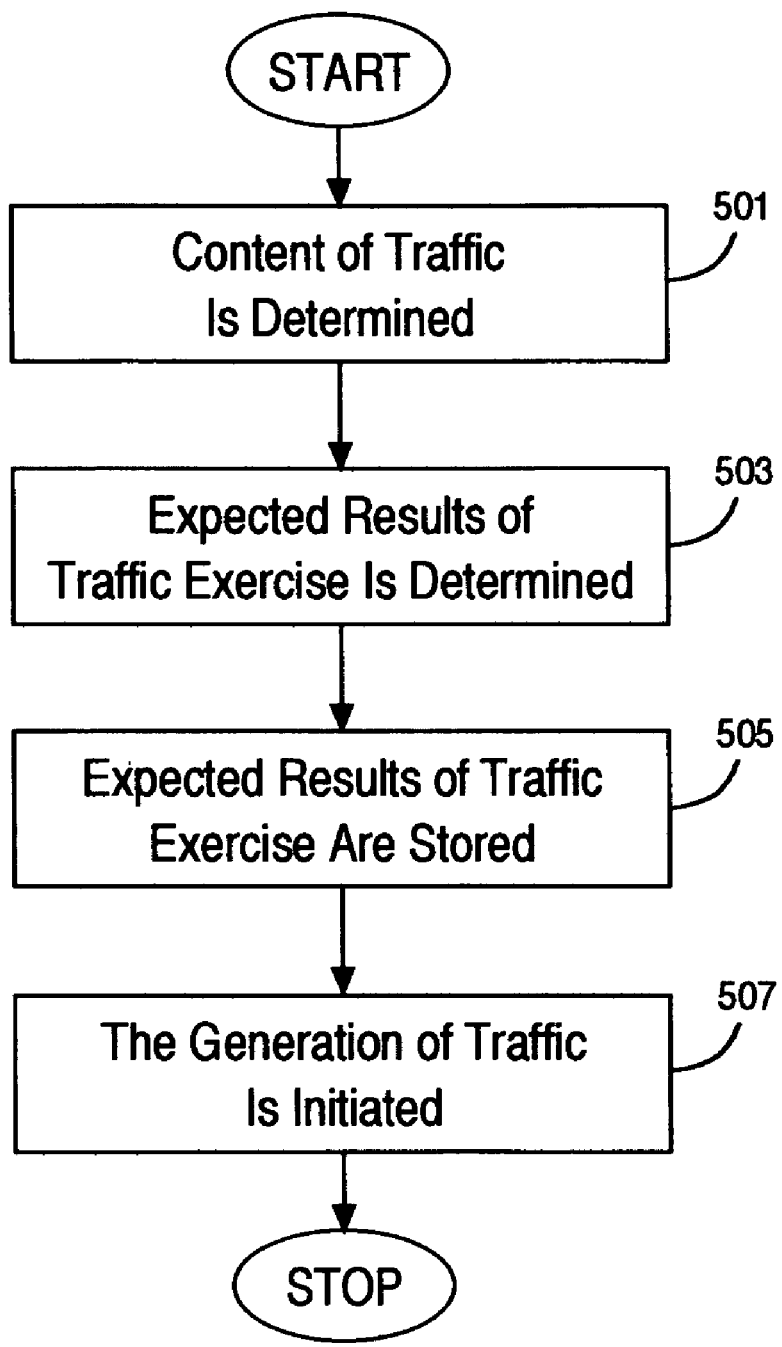
FIG. 5 shows a flowchart of a method for configuring a system for checking expected traffic (SCET) according to one embodiment of the present invention.

FIGS. 4 and 5 show a flowchart 400 and 500 of steps performed in a method for checking expected traffic (SCET) according to one embodiment of the present invention. The flowcharts include processes of the present invention that, in one embodiment, may be carried out by processors and electrical components under the control of computer-readable and computer-executable instructions. The computer-readable and computer-executable instructions reside, for example, in data storage features such as computer usable volatile memory and/or computer usable non-volatile memory. However, the computer-readable and computer-executable instructions may reside in any type of computer-readable medium. Although specific steps are disclosed in flowcharts 400 and 500, such steps are exemplary. That is, the present invention is well suited to performing various other steps or variations of the steps recited in the flowcharts. Within various embodiments, it should be appreciated that the steps of flowcharts 400 and 500 may be performed by software, by hardware or by a combination of both.

Referring to FIG. 4, at step 401, expected results of a traffic checking exercise are accessed. In one embodiment, an expected results accessor (e.g., 201 in FIG. 2) accesses expected results of an expected traffic checking exercise. In one embodiment, expected results are calculated by an application program (e.g., software 105 in FIG. 1A) and accessed therefrom. In one embodiment, expected results can include expected content verification information for each component of traffic.

At step 403, traffic that is generated by the DUT 103 is accessed. In one embodiment, each component of the accessed traffic includes associated component content verification information. In one embodiment, each component of the accessed traffic is assessed by a traffic component identifier (e.g., 207 in FIG. 2) to determine if the traffic component content verification information which is associated with the traffic components matches the traffic components content verification information that is expected.

At step 405, traffic components are identified whose expected content verification information (e.g., 355 in FIG. 3C) does not match its associated content verification information (e.g., 153 in FIG. 1A) and traffic components whose expected content verification information (e.g., 355 in FIG. 3C) does match its associated content verification information (e.g., 153 in FIG. 1A). In one embodiment, a traffic component identifier (e.g., 207 in FIG. 2) is employed to identify traffic components whose expected content verification information (e.g., 355 in FIG. 3C) does not match its associated content verification information (e.g., 153 in FIG. 1A) and data units whose expected content verification information (e.g., 355 in FIG. 3C) does match its associated content verification information (e.g., 153 in FIG. 1A).

At step 407, instances are counted where expected content verification information of a traffic component (e.g., 355 in FIG. 3C) matches actual content verification information (e.g., 153 in FIG. 1A) of a traffic component and instances where expected content verification data of a traffic component does not match actual content verification data of a traffic component.

At step 408, the SCET forwards unexpected traffic components to an analysis sub-system (e.g., 107 in FIG. 1A) for analysis purposes. It should be appreciated that steps 401 to 408 are repeated for each traffic component that is received.

At the end of the test, at step 409, a count of matches of expected content verification information and actual content verification information for each traffic component is compared to an expected count in order to identify duplicated or lost packets.

FIG. 5 shows a flowchart 500 of steps performed in a method for checking expected traffic (SCET) (steps performed to configure the traffic checking exercise) according to one embodiment of the present invention.

At step 501, content of traffic to be generated for a performance of a traffic checking exercise is determined. In one embodiment, traffic having it's content determined is generated by a signal source during the traffic checking exercise.

At step 503, expected results of the traffic checking exercise that are based on the traffic to be generated are determined. In one embodiment, values of expected results of the traffic checking exercise are calculated.

At step 505, the generation of traffic from a traffic generator is initiated. In one embodiment, the generation of traffic is only initiated after the expected results of the traffic checking exercise are transmitted to storage units.

With reference to exemplary embodiments thereof, methods and systems for checking expected network traffic is disclosed. A method for checking expected network traffic includes accessing pre-registered expected results of a network traffic checking exercise that include expected packet content verification information for individual packets of the network traffic. In addition, the method includes accessing network traffic where individual packets of the network traffic include actual packet content verification information. Individual packets are identified that have expected packet content verification information that does not match their actual packet content verification information and individual packets are identified that have expected packet content verification information that does match their actual packet content verification information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for checking expected network traffic, comprising:
    a computer system accessing pre-registered expected results of a network traffic checking exercise that comprise expected packet content verification information for individual packets of said network traffic;
    accessing said network traffic wherein individual packets of said network traffic comprise actual packet content verification information;
    identifying said individual packets that have expected packet content verification information that does not match their actual packet content verification information and said individual packets that have expected packet content verification information that does match their actual packet content verification information;
    counting instances where said expected packet content verification information matches said actual packet content verification information for said individual packets and instances where said expected packet content verification information does not match said actual packet content verification information for said individual packets; and
    comparing a count of matches of said expected content verification information and said actual content verification information for each traffic component to an expected count of matches in order to identify duplicated or lost traffic components.

2. The method of claim 1 further comprising:
    directing the forwarding of unexpected traffic components to an analysis sub-system.

3. The method of claim 1 wherein modifications to each portion of said individual packets are determined using said packet content verification information without a need to check individual fields associated with each portion of said individual packets.

4. The method of claim 1 wherein said expected packet content verification information is an expected frame check sequence (FCS).

5. The method of claim 1 wherein said expected results are predetermined and involve the content of said individual packets as well as a particular port upon which said individual packets will be received.

6. The method of claim 1 wherein modifications to said individual packets are determined by checking an FCS associated with said individual packets.

7. The method of claim 1 wherein said identifying is performed by a content addressable memory (CAM).

8. The method of claim 2 wherein said counting is performed by access control list (ACL) logging counters.

9. A system for checking expected traffic, comprising:
    an expected results accessor for accessing expected results of an expected traffic checking exercise that comprises expected packet content verification information for individual packets;
    a traffic accessor for accessing traffic wherein individual packets comprise packet content verification information;
    a traffic identifier for identifying said individual packets that have expected packet content verification information that does not match their actual packet content verification information and said individual packets that have expected packet content verification information that does match their actual packet content verification information;
    a counter for counting instances where said expected packet content verification information matches said actual packet content verification information for said individual packets and instances where said expected packet content verification information does not match said actual packet content verification information for said individual packets; and a comparator for comparing a count of matches of said expected packet content verification information and said actual packet content verification information for individual packets to an expected count of matches in order to identify duplicated or lost traffic components.

10. The system of claim 9 further comprising:
a packet forwarding director for directing the forwarding of unexpected packets to an analysis sub-system.

11. The system of claim 9 wherein modifications to each portion of said individual packets are determined using said packet content verification information without a need to check individual fields associated with each portion of said individual packets.

12. The system of claim 9 wherein said expected packet content verification information is an expected frame check sequence (FCS).

13. The system of claim 9 wherein said expected results are predetermined and involve the content of said packet as well as a particular port upon which said data packet will be received.

14. The system of claim 9 wherein modifications to said packet are determined by checking an FCS associated with said traffic component.

15. The system of claim 9 wherein said identifying is performed by a content addressable memory (CAM).

16. The system of claim 10 wherein said counting is performed by access control list (ACL) logging counters.

17. A non-transitory computer-useable medium having computer useable code embodied therein causing a computer to perform operations, comprising:
obtaining pre-registered expected results of a network traffic checking exercise that comprise expected packet content verification information for individual packets of said network traffic;
receiving said network traffic wherein individual packets of said network traffic comprise actual packet content verification information;
selecting said individual packets that have expected packet content verification information that does not match their actual packet content verification information and said individual packets that have expected packet content verification information that does match their actual packet content verification information;
counting instances where said expected packet content verification information matches said actual packet content verification information for said individual packets and instances where said expected packet content verification information does not match said actual packet content verification information for said individual packets; and
comparing a count of matches of said expected content verification information and said actual content verification information for each traffic component to an expected count of matches in order to identify duplicated or lost traffic components.

18. The medium of claim 17 further comprising:
directing the forwarding of unexpected traffic components to an analysis sub-system.

19. The medium of claim 17 wherein modifications to each portion of said individual packets are determined using said packet content verification information without a need to check individual fields associated with each portion of said individual packets.

20. The medium of claim 17 wherein said expected packet content verification information is an expected frame check sequence (FCS).

21. The medium of claim 17 wherein said expected results are predetermined and involve the content of said individual packets as well as a particular port upon which said individual packets will be received.

22. The medium of claim 17 wherein modifications to said individual packets are determined by checking an FCS associated with said traffic component.

23. The medium of claim 17 wherein said selecting is performed by a content addressable memory (CAM).

24. The medium of claim 18 wherein said counting is performed by access control list (ACL) logging counters.

25. A method for performing a computer network traffic checking exercise, comprising:
a computer system determining content of network traffic to be generated for a performance of said traffic checking exercise;
determining expected results of said traffic checking exercise based upon said network traffic to be generated;
initiating the generation of traffic from a traffic generator for receipt by a device under test (DUT);
accessing said network traffic wherein individual packets of said network traffic comprise actual packet content verification information;
identifying said individual packets that have expected packet content verification information that does not match their actual packet content verification information and said individual packets that have expected packet content verification information that does match their actual packet content verification information;
counting instances where said expected packet content verification information matches said actual packet content verification information for said individual packets and instances where said expected packet content verification information does not match said actual packet content verification information for said individual packets; and
comparing a count of matches of said expected content verification information and said actual content verification information for each traffic component to an expected count of matches in order to identify duplicated or lost traffic components.

* * * * *

UNITED STATES PATENT AND TRADEMARK OFFICE
CERTIFICATE OF CORRECTION

| | | |
|---|---|---|
| PATENT NO. | : 7,869,367 B2 | Page 1 of 1 |
| APPLICATION NO. | : 11/291200 | |
| DATED | : January 11, 2011 | |
| INVENTOR(S) | : Alan R. Albrecht et al. | |

It is certified that error appears in the above-identified patent and that said Letters Patent is hereby corrected as shown below:

In the drawings: On Sheet 2 of 8, in Fig. 1B, line 1, above "151" insert -- 150 --.

In the drawings: On Sheet 5 of 8, in Fig. 3B, line 1, above "305" insert -- 300 --.

Signed and Sealed this
Twenty-seventh Day of November, 2012

David J. Kappos
*Director of the United States Patent and Trademark Office*